(12) United States Patent
Pettit

(10) Patent No.: US 8,418,770 B2
(45) Date of Patent: Apr. 16, 2013

(54) MULTI-PROCESS ELECTRONIC CONTROL VALVE SYSTEM

(75) Inventor: Paul T. Pettit, Terlton, OK (US)

(73) Assignee: OCV Control Valves, Tulsa, OK (US)

( * ) Notice: Subject to any disclaimer, the term of this patent is extended or adjusted under 35 U.S.C. 154(b) by 321 days.

(21) Appl. No.: 12/849,526

(22) Filed: Aug. 3, 2010

(65) Prior Publication Data

US 2011/0024132 A1    Feb. 3, 2011

Related U.S. Application Data

(60) Provisional application No. 61/273,333, filed on Aug. 3, 2009.

(51) Int. Cl.
*E21B 43/12*   (2006.01)
*E21B 34/02*   (2006.01)

(52) U.S. Cl.
USPC ........... 166/373; 166/53; 166/66.6; 166/68.5; 166/320

(58) Field of Classification Search ........... 166/53, 166/373, 386, 66, 66.6, 68.5, 320, 369, 319; 137/487.5
See application file for complete search history.

(56) References Cited

U.S. PATENT DOCUMENTS

| | | | | |
|---|---|---|---|---|
| 2,626,127 A | * | 1/1953 | Crookston | 173/6 |
| 3,543,784 A | * | 12/1970 | Smith | 137/487 |
| 5,176,164 A | * | 1/1993 | Boyle | 137/155 |
| 5,348,036 A | * | 9/1994 | Oksanen et al. | 137/1 |
| 5,460,196 A | * | 10/1995 | Yonnet | 137/12 |
| 5,967,176 A | * | 10/1999 | Blann et al. | 137/489.5 |
| 6,338,358 B1 | * | 1/2002 | Watanabe et al. | 137/102 |
| 6,595,237 B2 | * | 7/2003 | Cecchinato et al. | 137/489.5 |
| 6,776,180 B1 | * | 8/2004 | Yonnet | 137/14 |
| 6,935,363 B2 | * | 8/2005 | Lamont et al. | 137/492 |
| 7,147,430 B2 | * | 12/2006 | Wiggins et al. | 415/19 |
| 7,201,180 B2 | * | 4/2007 | Ephrat et al. | 137/14 |
| 7,318,447 B2 | * | 1/2008 | Law | 137/487.5 |
| 8,091,582 B2 | * | 1/2012 | Folk | 137/489 |
| 2002/0011580 A1 | * | 1/2002 | Johansen et al. | 251/129.1 |
| 2009/0056324 A1 | * | 3/2009 | Itakura et al. | 60/421 |
| 2010/0126601 A1 | * | 5/2010 | Heron et al. | 137/488 |
| 2010/0168927 A1 | * | 7/2010 | Burrows | 700/282 |
| 2011/0024132 A1 | * | 2/2011 | Pettit | 166/373 |
| 2011/0146602 A1 | * | 6/2011 | Kato | 123/90.12 |

* cited by examiner

*Primary Examiner* — Jennifer H Gay

(74) *Attorney, Agent, or Firm* — Fellers, Snider, Blankenship, Bailey & Tippens, P.C.; David G. Woodral

(57) ABSTRACT

A valve system has a main valve that is adjustable for output flow and pressure. The system also includes an output flow transducer, an output pressure transducer, and a fluid depth transducer. A microcontroller is operatively coupled to the valve, the output flow transducer, the output pressure transducer, and the fluid depth transducer. The microcontroller operates the valve to selectively control the output flow, the output pressure, and the fluid depth according to inputs received from a user.

20 Claims, 3 Drawing Sheets

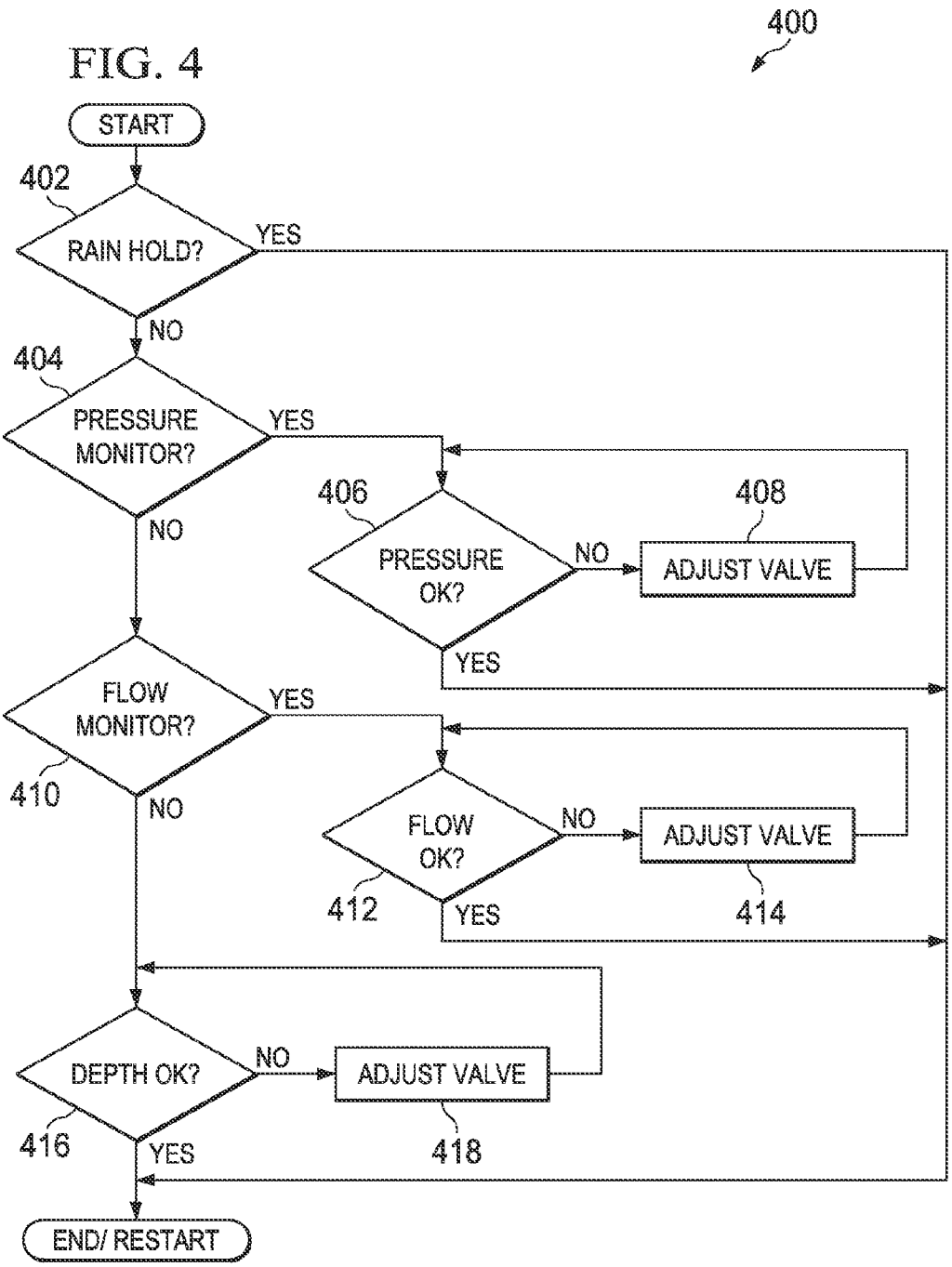

MULTI-PROCESS ELECTRONIC CONTROL VALVE SYSTEM

CROSS REFERENCE TO RELATED APPLICATIONS

This application claims the priority of U.S. Provisional Patent Application No. 61/273,333 entitled "MULTI-PROCESS ELECTRONIC CONTROL VALVE SYSTEM," filed Aug. 3, 2009, the contents of which are hereby incorporated by reference.

FIELD OF THE INVENTION

This disclosure relates to control valves in general and, more specifically, to control valve systems for fluid wells.

BACKGROUND OF THE INVENTION

In some areas of the world, access to ground water supplies must be carefully monitored. Existing wells should not be drawn down below a certain level, while at the same time farmers and rancher need reliable access to the well water that is available. In situations where water is plentiful, it is often the case that the amount of water being drawn from a well will need to be within a certain flow rate or pressure range to be suitable to the water system utilizing the well (for example, an irrigation system).

In some cases, access to well water may only be needed on a seasonal or sporadic basis. For example, in times of heavy rain, little or no water may be needed for irrigation. In times like these, it is important for What is needed is a system and method for addressing the above and related concerns.

SUMMARY OF THE INVENTION

The invention of the present disclosure, in on aspect thereof, comprises a valve system. The system has a main valve that is adjustable for output flow and pressure. The system also includes an output flow transducer, an output pressure transducer, and a fluid depth transducer. A microcontroller is operatively coupled to the valve, the output flow transducer, the output pressure transducer, and the fluid depth transducer. The microcontroller operates the valve to selectively control the output flow, the output pressure, and the fluid depth according to inputs received from a user.

In some embodiments, the main valve is hydraulically operated and may be diaphragm actuated and pilot controlled. The system may include one ore more electrically actuated solenoid pilot valves attached to the main valve and controlling the main valve in response to a signal from the microcontroller. One pilot valve may be normally open, and when de-energized by the microcontroller act to close the main valve. A needle valve may be operatively connected to the main valve to control the opening speed of the main valve. Another may be connected to the main valve to control the closing speed of the main valve. A check valve may be provided to prevent fluid flow in a reverse direction through the main valve.

In some embodiments, a control panel is operatively coupled to the microcontroller for receiving user inputs. A rain holdoff control may be provided for signaling the microcontroller to close the main valve.

BRIEF DESCRIPTION OF THE DRAWINGS

FIG. 4 is a flow diagram of one method of operation of the valve control system of the present disclosure.

DETAILED DESCRIPTION OF THE PREFERRED EMBODIMENTS

The multi-process electronic control valve system as disclosed herein provides at least three functions relating to the control and flow of fluids. These functions are pressure, flow, and fluid depth. Although the embodiments are described with particular reference to an embodiment to be utilized with water wells, it is understood that the device of the present disclosure is readily adaptable to any fluid flow control application needing the functionality disclosed herein. Therefore the examples of the multi-process electronic control valve system in this specification is meant to be exemplary only, and not meant to be limiting in any way.

Figure 1:
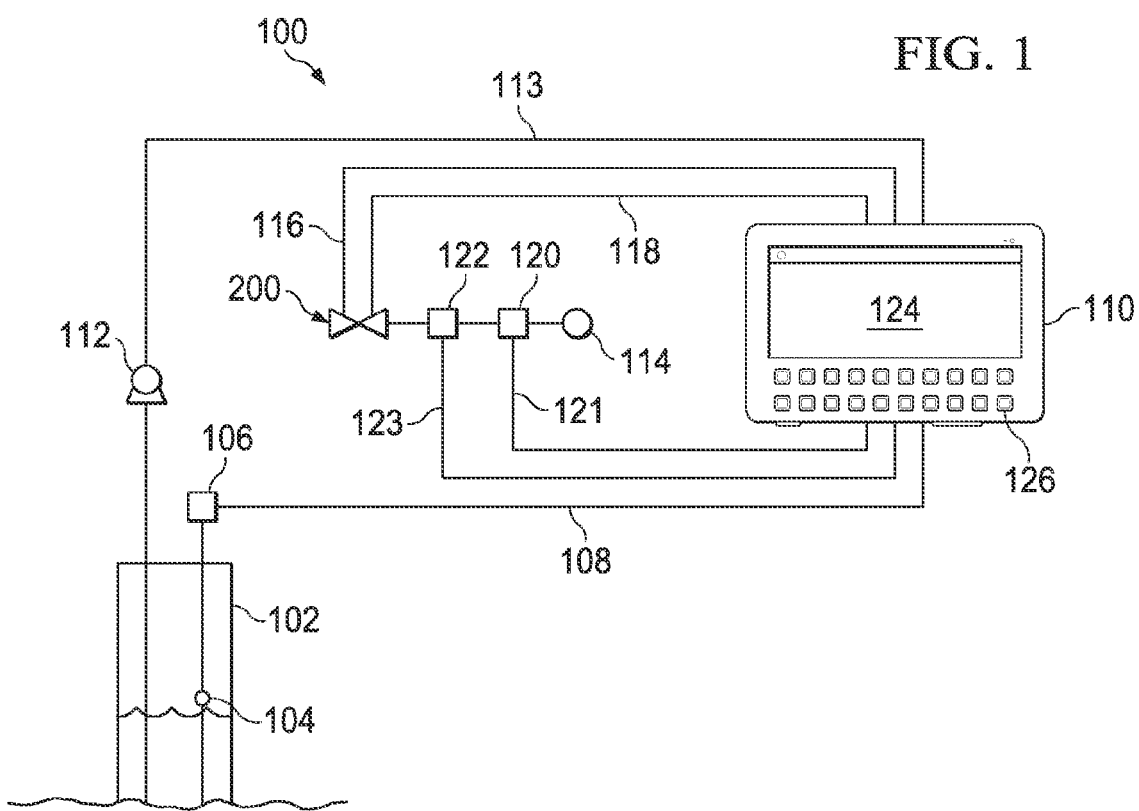
FIG. 1 is a schematic diagram of a control valve system installed on a well according to aspects of the present disclosure.

Referring now to FIG. 1, a schematic diagram of a control valve system installed on a well according to aspects of the present disclosure is shown. The system 100 is installed onto a water well 102 or other fluid reservoir. The system 100 selectively controls a pressure output, a flow rate, and a well depth, as will be described herein. A water level 104 of the well 102 may be monitored and reported by a depth transducer 106. An electrical signal indicating a depth of the water 104 or other fluid may be transmitted electronically on an electronic signal line 108. This information is monitored and utilized by the control unit 110. In the present disclosure, all transducer signal lines may be analog or digital depending upon the transducer employed. A pump 112 may be submerged in the well 102 or may be placed remotely therefrom. The pump 112 provides fluid under pressure to a valve assembly 200 that may be connected to a well output 114. In some embodiments, the control unit 110 may also activate and deactivate the pump 112 by pump signal line 113.

The control unit 110 may connect to the valve assembly 200 by at least two signal lines. An open signal line 116 may provide a signal from control unit 110 to valve assembly 200 indicating to open or increase the opening of the valve assembly 200. A close signal line 118 interconnecting the control unit 110 and the valve assembly 200 may provide for a signal indicating that the valve assembly 200 should be partially or fully closed.

A flow transducer 120 may be provided on or near the output 114 for providing an electric signal on signal line 121 to the control unit 110 indicating the flow rate of the output 114. A pressure transducer 122 may provide a signal on signal line 123 to the control unit 110 indicating a pressure at the output port 114. It will be appreciated that the control unit 110, having the combined signals from the depth transducer 106, the flow transducer 120, and the pressure transducer 122 may signal the valve assembly 200 to open or close in order to selectively control the depth, flow rate, or pressure of the output 114.

In the present embodiment, the control unit 110 provides for user selection of the monitoring and control function of the system 100. In order to facilitate interaction with the user, the control unit 110 may provide various I/O devices, including a view screen 124 and a keypad 126. Via interaction with the system 100, using the view screen 124 and keypad 126, a user can control various modes of operation and parameters of the system 100.

Figure 2:
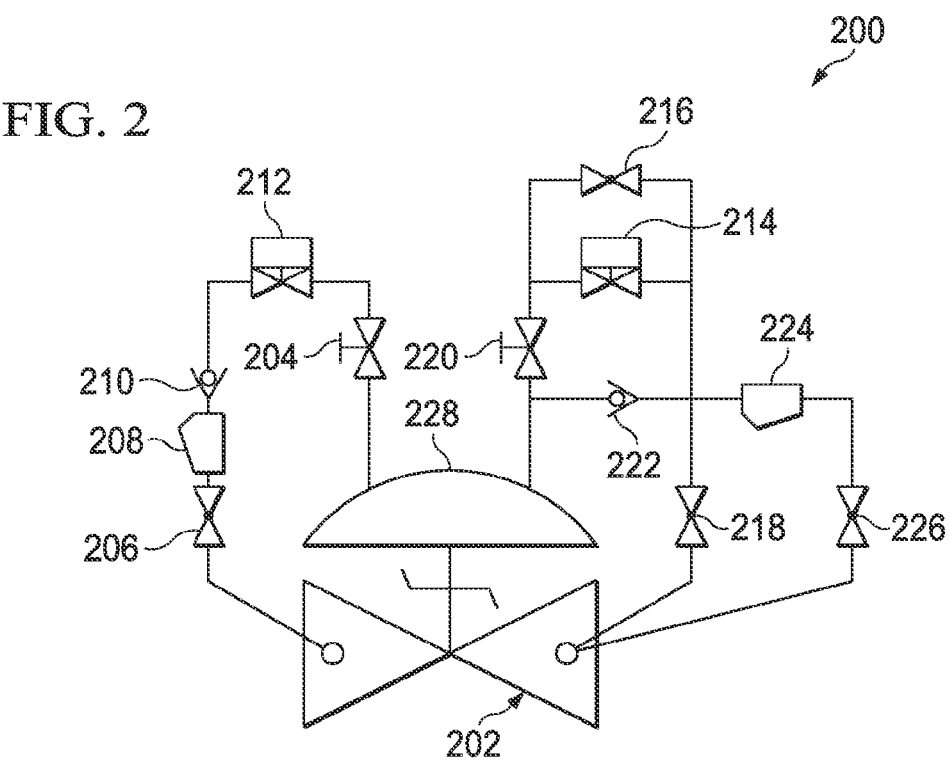
FIG. 2 is a diagram of a valve assembly according to aspects of the present disclosure.

Referring now to FIG. 2, a diagram of a valve assembly 200 according to aspects of the present disclosure is shown. The valve assembly 200 interacts with the control unit 110 to open and close in response to signals therefrom. The valve assembly 200 may be able to open or close fully, as well as having a high degree of fine tuning and adjustability between the fully closed and fully open positions. A main valve 202 is provided that interposes the pump 112 and the output port 114. In the present embodiment, the main valve 202 is a hydraulically operated diaphragm actuated and pilot controlled globe valve, but in other embodiments the valve could be victaulic, threaded, or another type of valve. In the present embodiment, the main valve 202 will close with an elastomer on metal seal. In the configuration of the present embodiment, shown in FIG. 2, the main valve 202 is interconnected with a needle valve 204 that controls the closing speed of the valve 202. In order to control the amount of overshoot or hysteresis of the system 100, the needle valve 204 may be set to a suitable speed to allow the main valve 202 to close with sufficient speed so as to be responsive, but also prevents it from closing so fast as to cause an undesirable amount of overshoot when closing the valve. In some embodiments, the needle valve 204 may be adjustable by the end user.

Some embodiments will provide an isolation ball valve 206 in series with the needle valve 204. A strainer 208 may be provided to protect the components of the fluid circuit from contamination. A check valve 210 may also operate to prevent reverse flow through the needle valve circuit as well. In the present embodiment, the actual closing of the main valve 202 is controlled by an electric solenoid 212. In the present embodiment, the solenoid 212 is a normally open electric solenoid pilot valve. The solenoid 212 may be electrically connected to the control unit 110 to receive signals therefrom and to close the main valve 202 in response.

In order to affect an opening of the main valve 202, a separate valve circuit is provided for a second solenoid 214. The solenoid 214 in the present embodiment is a normally open electric solenoid pilot valve. In response to a signal from the control unit 110, the solenoid 214 will open to cause the main valve 202 to open and thereby increase flow rate and pressure on the output port 114. An isolation ball valve 216 is provided in parallel with the solenoid 214. Additional isolation ball valves 218, 226 are provided in series. As on the closing side, the opening side provides a needle valve 220 that may be tuned in order to control the opening speed of the valve 202. As before, the opening speed may be set to provide a requisite degree of responsiveness from the main valve 202 while being slow enough to prevent an undesirable amount of overshoot. A check valve 222 is provided in the circuit to prevent undesirable reverse flow of fluids through the fluid circuit. A strainer 224 aids in preventing contamination of the components.

The present embodiment shown in FIG. 2 provides a position transmission assembly 228 that interconnects with the main valve 202. This allows the relative degree of opening or closing of the valve 202 to be provided back to the control unit 110. In some embodiments, this information may be available to the user. In the present embodiment, the information provided by the position transmission assembly 228 is not necessarily needed by the control unit 110.

Figure 3:
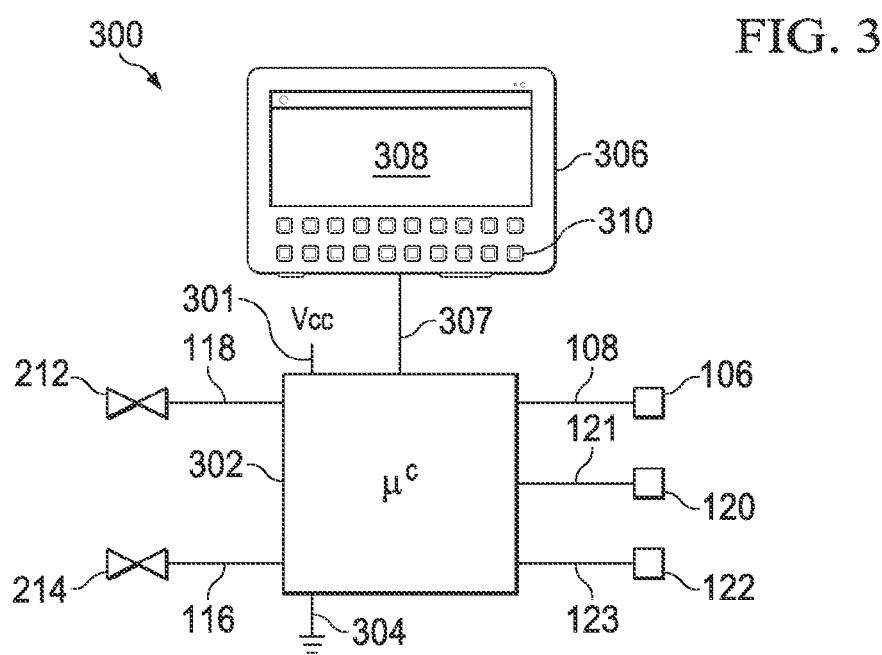
FIG. 3 is schematic diagram of a valve control unit according to aspects of the present disclosure.

Referring now to FIG. 3, a schematic diagram 300 of a valve control unit according to aspects of the present disclosure is shown. FIG. 3 provides one possible way in which the control unit 300 can be constructed. It will be appreciated that the control unit 300 is an expansion or elaboration on the control unit 110 shown in FIG. 1. The control unit 300 may be based around a microcontroller 302. The microcontroller 302 may be an integrated circuit or a general purpose microprocessor that has been programmed according to the functionality described herein. The microcontroller 302 is provided to a power supply Vcc 301 and a ground source 304. These may be based upon a battery system or may be a part of the commercial electric grid. A console 306 connects to the microcontroller 302 via data bus 307. A video display 308 and a keypad 310 are provided to allow a user to interact with the microcontroller 302.

It can be seen that the microcontroller 302 provides open signal line 116 and closed signal line 118 to the respective pilot valves 214, 212. This enables the microcontroller 302 to affect the opening and closing of the main valve 202. It is understood that a relay network may actually be provided by the open and closed signal lines 116, 118, if such are needed to effectively power and operate the solenoids 212, 214.

The transducers for depth 106, flow 120, and pressure 122 may provide their data on signal lines 108, 121 and 123, respectively. These may be read by the microcontroller 302. It is understood that various signal conditioning and/or analog to digital conversion may take place between the microcontroller 302 and the various transducers.

In operation, a user will interact with the microcontroller 302 using the keypad 310 and the display screen 308. At this point, a user may indicate to the microcontroller 302 which of the selective operations is desired. Operations available to the user may include, but are not limited to: operating the pump 112 and/or valve assembly 200 to maintain a desired fluid level 104 in the well 102; maintaining a specified pressure; and maintaining a specified flow rate. It will be appreciated that, in some instances, more than one of these functions may be controlled at a time. However, in other cases owing to limitations of water supply and pressure, it may only be possible to control one of the desired parameters based upon a selection from the user. For example, if the well has plenty of water, the amount of pressure may be the most critical due to limitations of the downstream irrigation system. In other cases, the amount of water flow required (e.g., for crops) may take precedent over the pressure being generated.

Referring now to FIG. 4, a flow diagram 400 of one method of operation of the valve control system 100 of the present disclosure is shown. At step 402, it may be determined whether the system has been set on rain hold. If the system has been set on rain hold, this would indicate that the user did not desire for the control unit 110 to do anything. In this case, the control program may end (or restart) and continue querying at step 402 until such time as the rain hold has been released.

If at step 402 there is no rain hold, at step 404 the determination may be made by the control unit as to whether the pressure monitoring function has been selected by the user. If so, at step 406 a reading may be taken of the pressure transducer 122 in order to determine whether or not the desired pressure has already been achieved. If the desired pressure has not been achieved, the valve may be adjusted at step 408 and the pressure checked again at step 406. Through iterations of adjusting the valve 408, it can be determined when the pressure is within the desired threshold at step 406. Once the desired pressure has been achieved, the control loop will end or repeat until a different parameter is selected or until the rain hold is re-engaged.

It will be appreciated that the step of adjusting the valve 408 may include signaling the valve 202 to open further, or close further, depending on the reading from the appropriate transducer. It may also require several steps of adjusting in order to achieve the desired flow rate or pressure.

If the pressure monitor function has not been selected at step 404, it may be determined at step 410 whether the flow monitor function has been selected. If so, the flow transducer 120 may be checked or queried at step 412 to determine if the flow rate is within the specified range. If not, the valve may be adjusted at step 414. The flow rate may be again checked at step 412 and the adjustment and checking process repeated until the flow rate is within the desired parameters. At this point, the controller terminates or continues monitoring or waiting for an additional command.

If at step 410 the flow monitor function has not been selected, this indicates that the depth control function has been selected by the user. At step 416, a depth reading may be taken by the depth transducer 106. Depending upon the signal return from the depth transducer 106, the valve may be adjusted at step 418. It will be appreciated that changes in depth may occur much more slowly than changes in flow rate or pressure. Therefore, it may be desirable to limit the amount of valve adjustment that can occur at step 418. It is also understood that the valve assembly 200 cannot be opened beyond full capacity. Thus, the query at step 412 may also include an accounting of the position of the main valve 202. If at step 416 the depth 104 has fallen below the specified parameter indicating that the valve assembly 200 should be closed off, the control loop simply waits for further additional commands, as there is no further need to adjust the valve at step 418.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A valve system comprising:
   a main valve that is adjustable to selectively control output flow and pressure;
   an output flow transducer;
   an output pressure transducer;
   a fluid depth transducer; and
   a microcontroller;
   wherein the microcontroller is operatively coupled to the valve, the output flow transducer, the output pressure transducer, and the fluid depth transducer; and
   wherein the microcontroller operates the valve to selectively control the output flow, the output pressure, and the fluid depth according to inputs received from a user.

2. The valve system of claim 1, wherein the main valve is hydraulically operated.

3. The valve system of claim 1, wherein the main valve is diaphragm actuated and pilot valve controlled.

4. The valve system of claim 3, further comprising an electrically actuated solenoid pilot valve attached to the main valve and controlling the main valve in response to a signal from the microcontroller.

5. The valve system of claim 3, wherein the pilot valve is normally open, and when de-energized by the microcontroller acts to close the main valve.

6. The valve system of claim 3, further comprising a needle valve operatively connected to the main valve to control the opening speed of the main valve.

7. The valve system of claim 3, further comprising a needle valve operatively connected to the main valve to control the closing speed of the main valve.

8. The valve system of claim 3, wherein the pilot valve is normally closed and acts to open the main valve when energized by the microcontroller.

9. The valve system of claim 1, further comprising a control panel operatively coupled to the microcontroller for receiving user inputs.

10. The valve system of claim 1, further comprising a rain holdoff control for signaling the microcontroller to close the main valve.

11. The valve system of claim 1, further comprising a check valve that prevents fluid flow in a reverse direction through the main valve.

12. A valve system comprising:
    a microcontroller;
    a hydraulically operated, diaphragm actuated main valve that opens and closes to regulate flow of water from a well;
    a first electrically actuated solenoid pilot valve attached to the main valve and closing the main valve in response to a first signal from the microcontroller;
    a second electrically actuate solenoid pilot valve attached to the main valve and opening the main valve in response to a second signal from the microcontroller; and
    a first needle valve that controls an opening speed of the main valve;
    wherein the microcontroller selectively provides the first and second signals to the first and second solenoid pilot valves to selectively maintain at least one of an output pressure from the main valve, a flow rate from the main valve, and a depth of water in the well.

13. The valve system of claim 12, further comprising a second needle valve that controls a closing speed of the main valve.

14. The valve system of claim 12, further comprising a depth transducer that reports the water depth to the microcontroller.

15. The valve system of claim 12, further comprising:
    a flow transducer that reports an output flow to the microcontroller; and
    a pressure transducer that reports the output pressure to the microprocessor.

16. The system of claim 12, a control panel for accessing user inputs and reporting system information to the user.

17. The system of claim 16, wherein the microcontroller closes the main valve in response to a rain holdoff input received by the user via the control panel.

18. A method of selectively controlling pressure, flow rate, and well water depth at a well, comprising:
    providing a hydraulically operated, diaphragm actuated main valve;
    providing a first electrically actuated solenoid pilot valve attached to the main valve that closes the main valve in response to a closing signal;
    providing a second electrically actuates solenoid pilot valve attached to the main valve that closes the main valve in response to an opening signal;
    providing transducers for monitoring pressure, flow rate, and well water depth; and
    selectively reading the pressure, flow rate, and well water depth with a microcontroller and selectively providing the closing and opening signals to the first and second solenoid pilot valves, respectively, to control the main valve to selectively maintain a predetermined pressure, flow rate, and well water depth.

19. The method of claim 18, further comprising providing a control panel operatively coupled to the microcontroller for receiving user inputs.

20. The method of claim 19, further comprising closing the well with a signal from the microcontroller to the second solenoid pilot valve in response to receiving a rain hold input from the control panel.

* * * * *